INVENTOR.
WILLIAM O. REESER JR.
BY Leon F. Herbert
ATTORNEY

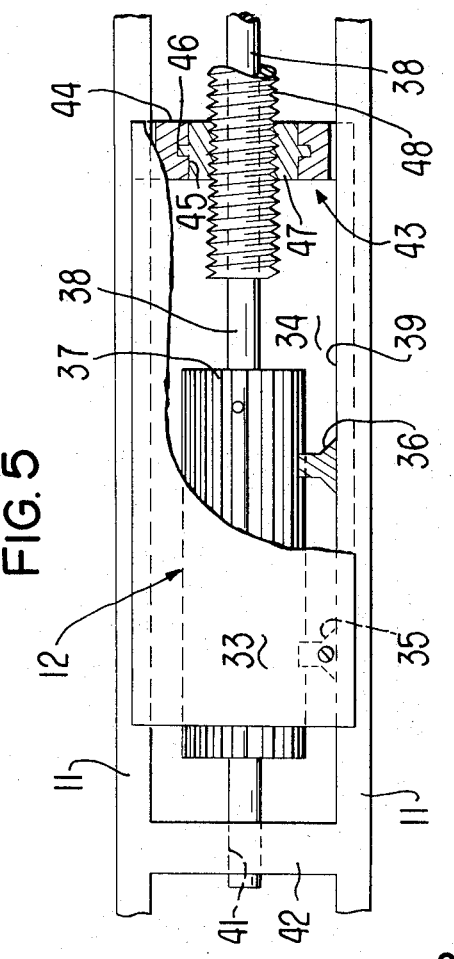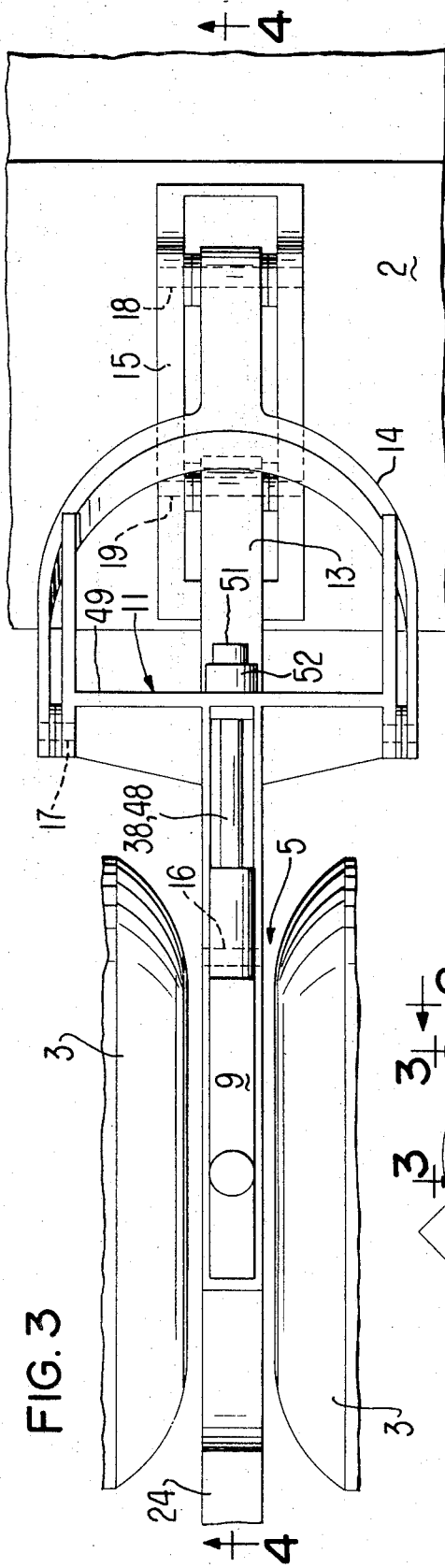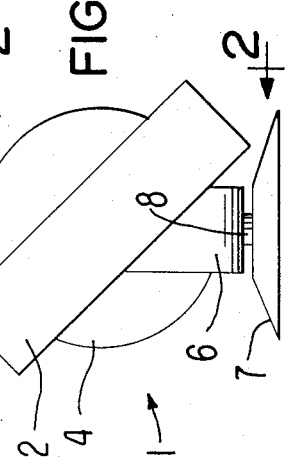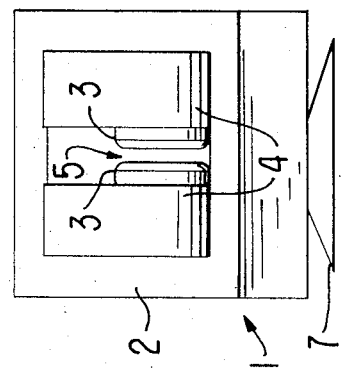

United States Patent Office 3,555,472
Patented Jan. 12, 1971

3,555,472
MAGNET EMPLOYING PROBE POSITIONING MEANS PIVOTABLE INTO THE GAP
William O. Reeser, Jr., Fremont, Calif., assignor to Varian Associates, Palo Alto, Calif., a corporation of California
Filed July 17, 1969, Ser. No. 842,500
Int. Cl. H01f 7/00
U.S. Cl. 335—210                     5 Claims

ABSTRACT OF THE DISCLOSURE

A magnet is disclosed having a probe positioning structure for swinging a probe into and out of the gap of the magnet. The probe positioning structure is in the general configuration of a four sided structure pivotably joined at the four corners of an imaginary parallelogram. The probe is carried from one side and the opposed side is fixed such that a constant reference direction for the probe is maintained as it is swung in and out of the gap. A dampener dampens movement of the probe at the limits of its movement. A rack-and-pinion and a screw, operable from outside the gap via concentric independent control shafts, permit horizontal and vertical adjustments of the probe position.

DESCRIPTION OF THE PRIOR ART

Heretofore, probe positioning structures have been appended to the yokes of magnets for moving probes into and out of the magnet gap. One such system employed a probe carriage unit slideable into and out of the gap in the horizontal direction of a pair of horizontal guide rods supported from the yoke. This system is disclosed and claimed in U.S. Patent 3,401,405 issued Sept. 10, 1968 and assigned to the same assignee as the present invention. However, this system, while maintaining a fixed reference direction for the probe to prevent spillage from accessory devices, was difficult to employ in magnets where the plane of the yoke was tilted 45° to the horizontal and positioning of and access to the probe was not as convenient as desired.

Other probe positioning structures have been hinged such that the probe could be swung into and out of the gap. Such a hinged system is disclosed in U.S. Patent 3,445,649 issued May 20, 1969 and assigned to the same assignee as the present invention. While the hinged probe positioning structure is convenient to use it did not provide a fixed reference direction for the probe and dependent accessories such that spillage from liquid filled accessories could occur.

SUMMARY OF THE PRESENT INVENTION

The principal object of the present invention is the probe within the gap of a magnet.

One feature of the present invention is the provision of a probe positioning structure having a four sided configuration which is pivotably connected together at four pivots with the pivot axes intersecting at the corners of an imaginary parallelogram in a plane perpendicular to the pivot axes. One side of the four sided structure supports the probe and the side opposite is held in a fixed position relative to the gap of a magnet to define a constant reference direction for the probe as it is swung into and out of the magnetic gap by the probe positioning structure.

Another feature of the present invention is the same as the preceding feature including the provision of an adjuster for adjusting the probe relative to the supporting side of the probe positioning structure, such adjuster having an actuator shaft extending outside the gap to permit easy access by an operator.

Another feature of the present invention is the same as the preceding feature wherein the probe position adjuster provides adjustment in two directions and the actuator includes two independently adjustable shafts, one being coaxial and concentric of the other.

Another feature of the present invention is the same as any one or more of the preceding wherein the probe positioning structure includes a motion dampener for dampening motion of the probe at the limits of its arcuate travel.

Other features and advantages of the present invention will become apparent upon a perusal of the following specification taken in connection with the accompanying drawings wherein:

BRIEF DESCRIPTION OF THE DRAWINGS

FIG. 1 is a side elevational view of a magnet to be employed with the probe positioning apparatus of the present invention, FIG. 2 is a view of the structure of FIG. 1, taken along line 2—2 in the direction of the arrows, FIG. 3 is an enlarged fragmentary view of the structure of FIG. 1 taken along line 3—3 in the direction of the arrows and modified to include the probe positioning structure, FIG. 5 is an enlarged sectional view, partly broken away, of a portion of the structure of FIG. 4 taken along line 5—5 in the direction of the arrows.

DESCRIPTION OF THE PREFERRED EMBODIMENTS

Figure 4:
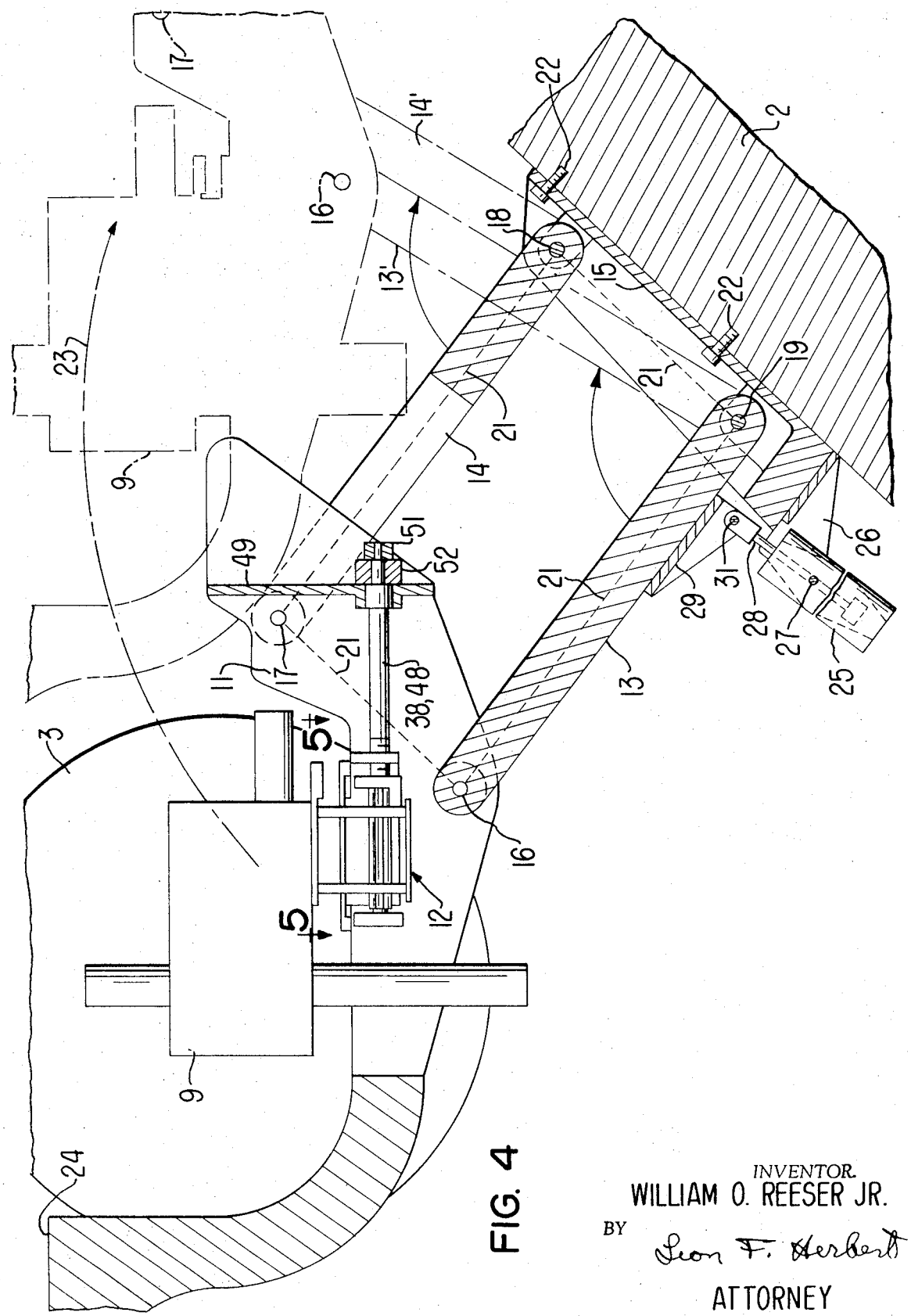
FIG. 4 is a sectional view of the structure of FIG. 3 taken along line 4—4 in the direction of the arrows.

Referring now to FIGS. 1 and 2, there is shown a magnet 1 to employ the probe positioning structure of the present invention. The magnet 1 includes a rectangular yoke structure 2 with the plane of the yoke inclined at 45° to the horizontal. A pair of reentrant magnetic armatures 3 are supported at their ends from the yoke 2. An electric coil 4 is wound around each armature 3. The coils 4 are energized with current to produce an intense magnetic field vector across the magnetic gap 5 of the magnet, such gap being defined by the space between the mutually approved inner ends of the armatures 3. A U-shaped support 6 is affixed to the yoke 2. The support 6 is rotatable about the vertical direction and sets atop a fixed base pedestal 7 and is supported therefrom by a thrust bearing 8. Such a magnet 1 is disclosed in U.S. Patent 2,947,920 issued Aug. 2, 1960 and assigned to the same assignee as the present invention.

Referring now to FIGS. 3 and 4, there is shown the probe positioning apparatus of the present invention as employed with the magnet 1 of FIGS. 1 and 2. More particularly, a probe 9, such as a nuclear magnetic resonance probe, to be positioned within the gap 5 is supported from a probe carriage structure 11 via the intermediary an adjustable table 12 which is movable with respect to the carriage structure 11, as more fully described below with regard to FIG. 5.

The probe carriage structure 11 forms one side of a four sided composite probe positioning structure which includes support arm 13, support yoke 14 and a mounting bracket 15. The four sided structure is pivotably joined together at four pivot joints 16, 17, 18 and 19. Each side of the four sided structure shares two of the four pivot joints and the pivot joints are arranged such that the pivot axes pass through the four corners of an imaginary parallelogram (indicated by dashed line 21 in FIG. 4) lying in a plane perpendicular to the pivoting axes, such plane also being perpendicular to the direction of the magnetic field vector across the gap 5 of the magnet 1. The probe carriage structure 11, forming one side of the composite four sided probe positioning structure, is disposed opposite the bracket 15. The bracket 15 is held in a fixed position against the yoke 2, and thus in a fixed position relative to the gap 5, via screws 22. This being the case, as the probe positioning structure is swung out of the gap 5 the probe 9 will traverse a curved path indicated by dashed line 23. Over this path 23, the probe 9 will maintain a fixed reference direction; namely, vertical to avoid tilting of the probe 9 and its accessories, such as liquid filled dewars, etc., typically carried upon the probe carriage structure on an appended platform portion such as platform 24. In the fully retracted position of the probe positioning structure, the pivoted support arms 13 and 14 assume positions as indicated by dashed lines 13′ and 14′, respectively. Although a separate bracket member 15 is shown in the preferred embodiment, this is not a requirement. Instead, the fixed side of the composite probe positioning structure could be formed by the yoke 2 to which the arms 13 and 14 would be pivotably mounted.

A dash pot 25 is affixed between the magnet yoke 2 and the movable composite probe positioning structure for dampening movement of the probe 9 at the limits of arcuate travel of the probe 9. More particularly, the dash pot 25 is pivotably supported from the yoke 2 and bracket 15 via a mounting bracket 26 and pivot 27. The plunger 28 of the dash pot 25 is pivotably secured to movable support arm 13 via bracket 29 and pivot 31. The interior elements of the dash pot are dimensioned such that the passageway for liquid flow around the plunger is constricted at the limits of travel of the plunger 28. Such limits of travel of the plunger 28 are arranged to correspond with the limits of travel of the probe 9. In this manner, the arcuate motion of the probe 9 is gently arrested at its limits of travel, whereas unimpeded or undamped motion is permitted between the travel limits.

Referring now to FIG. 5, the adjustable table portion 12 of the probe carriage structure 11, which supports the probe 9, includes a pair of vertically displaced plates 33 and 34 disposed above and below the hollow main body portion of the probe carriage structure 11. The plates 33 and 34 are interconnected via a pair of vertically directed rack members 35 and 36. The teeth of the rack members mate with teeth on a horizontally directed and elongated pinion 37 which is pinned to a horizontally directed rotatable actuating shaft 38. The rack members 35 and 36 are cranked up and down via pinion 37 and they slide against a vertical surface 39 of the probe carriage structure 11. One end of actuating shaft 38 rides in a bearing 41 in a fixed cross member 42 of the probe carriage structure 11.

One end 43 of the adjustable probe support table 12 includes a vertically directed plate 44 which interconnects upper and lower plates 33 and 34. End plate 44 includes a vertically elongated slot 45 with vertical key ways 46. A nut 47 is captured against rotation in the slot 45 and is permitted to slide vertically in the slot 45. A hollow screw 48 forms an actuator shaft for moving the probe table 12 in the horizontal direction by rotation of screw actuator shaft 48.

The vertical adjusting actuator shaft 38 is concentrically and coaxially disposed of the hollow horizontal adjusting actuator shaft 48. The shafts are independently rotatable and extend horizontally through a bearing opening in a cross member 49 of the probe carriage structure 11. The cross member 49 is located out of the gap 5 and calibrated adjusting knobs 51 and 52 are affixed to the shafts 38 and 48, respectively, for making calibrated adjustments in the vertical and horizontal position of the probe 9 within the gap 5 when the probe carriage structure is disposed in the gap 5 of the magnet.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a magnet apparatus, means forming a magnet structure having a pair of mutually opposed spaced apart magnetic poles to establish a magnetic gap therebetween, means for positioning a probe structure within the magnetic gap, the improvement wherein, said probe positioning means includes a probe carriage structure to which the probe is to be affixed and three additional support structures arranged in the general configuration of a four sided composite structure, means for pivotably interconnecting said probe carriage structure and said three support structures at four pivot joints with each of said four sides of said composite structure sharing two of said four joints and with the pivoting axes of said pivot joints passing through the four corners of an imaginary parallelogram lying in a plane perpendicular to the pivoting axes of said pivotable joints, and means for holding the side of said composite four sided structure which is opposite the probe carriage side in a fixed position relative to the magnet gap, whereby the probe is swingable in and out of the magnet gap while maintaining a fixed reference direction for the probe.

2. The apparatus of claim 1 wherein said means for holding the one side of said composite four side structure in a fixed position relative to the magnetic gap includes a magnetic yoke structure forming a portion of said magnet structure.

3. The apparatus of claim 1 wherein the plane of the imaginary parallelogram is perpendicular to the direction of the magnetic field vector in the gap of said magnet structure.

4. The apparatus of claim 1 wherein said probe carriage structure includes, a probe support member to which the probe is to be affixed, and means for moving said probe support member in a first direction with respect to the remainder of said probe carriage structure.

5. The apparatus of claim 4 including means for moving said probe support member relative to the remainder of said probe carriage structure in a second direction orthogonal to the first direction of movement.

References Cited

UNITED STATES PATENTS

| | | | |
|---|---|---|---|
| 3,030,556 | 4/1962 | Watson | 335—298 |
| 3,402,347 | 9/1968 | Nelson | 324—0.5 |

GEORGE HARRIS, Primary Examiner

U.S. Cl. X.R.

324—0.5; 250—41.9